United States Patent
Mueller

(10) Patent No.: US 10,710,013 B2
(45) Date of Patent: Jul. 14, 2020

(54) COMPACT AXIAL FLOW SEPARATOR

(71) Applicant: Mueller Environmental Designs, Inc., Brookshire, TX (US)

(72) Inventor: Fred J. Mueller, Houston, TX (US)

(73) Assignee: MUELLER ENVIRONMENTAL DESIGNS, INC., Brookshire, TX (US)

( * ) Notice: Subject to any disclaimer, the term of this patent is extended or adjusted under 35 U.S.C. 154(b) by 220 days.

(21) Appl. No.: 15/919,213

(22) Filed: Mar. 13, 2018

(65) Prior Publication Data
US 2018/0369731 A1    Dec. 27, 2018

Related U.S. Application Data

(60) Provisional application No. 62/470,319, filed on Mar. 12, 2017.

(51) Int. Cl.
| | | |
|---|---|---|
| B01D 50/00 | (2006.01) | |
| B01D 45/16 | (2006.01) | |
| B04C 3/06 | (2006.01) | |
| B04C 3/04 | (2006.01) | |
| B01D 45/02 | (2006.01) | |
| B04C 3/00 | (2006.01) | |

(52) U.S. Cl.
CPC .............. B01D 45/16 (2013.01); B04C 3/04 (2013.01); B04C 3/06 (2013.01); B01D 45/02 (2013.01); B04C 2003/006 (2013.01)

(58) Field of Classification Search
CPC .......... B01D 45/16; B01D 45/02; B04C 3/04; B04C 3/06; B04C 2003/006
See application file for complete search history.

(56) References Cited

U.S. PATENT DOCUMENTS

| | | | | |
|---|---|---|---|---|
| 2,792,075 A | * | 5/1957 | McBride | B04C 5/28 55/321 |
| 3,793,812 A | * | 2/1974 | Willis | B01D 45/12 55/338 |
| 3,888,644 A | * | 6/1975 | Holland | B01D 46/00 55/318 |
| 3,997,303 A | * | 12/1976 | Newton | B01D 46/00 95/284 |
| 4,180,391 A | * | 12/1979 | Perry, Jr. | B01D 45/16 55/324 |

(Continued)

*Primary Examiner* — Dung H Bui
(74) *Attorney, Agent, or Firm* — Conley Rose, P.C.

(57) ABSTRACT

Systems are disclosed for separating and collecting liquid and particulate from a flowing gas stream. The systems may include a plurality of horizontally oriented helical separators positioned in a vessel between a gas stream inlet and a gas stream outlet. The helical separators form helical channels for the gas stream and may include an upstream conical portion. The vessel includes a first space upstream from the helical separators wherein the gas stream changes direction before entering the helical separators, such that the change in direction causes mechanical separation of liquids or solids from the gas stream. The vessel may also form a second space downstream from the helical separators for collecting liquid and particulate separated from the gas stream. The first and second spaces in the vessel may each include a drain which empties into a common sump, such that the first and second spaces are in fluid communication.

9 Claims, 2 Drawing Sheets

(56) References Cited

U.S. PATENT DOCUMENTS

| | | | | |
|---|---|---|---|---|
| 4,247,313 A * | 1/1981 | Perry, Jr. | B01D 46/0068 | 55/302 |
| 4,297,116 A * | 10/1981 | Cusick | B01D 46/002 | 55/319 |
| 4,359,329 A * | 11/1982 | Willeitner | F25B 43/02 | 55/320 |
| 4,539,023 A * | 9/1985 | Boley | B01D 1/305 | 96/184 |
| 4,591,367 A * | 5/1986 | Pek | B01D 45/12 | 55/344 |
| 5,919,284 A * | 7/1999 | Perry, Jr. | B01D 45/02 | 55/319 |
| 6,214,220 B1 * | 4/2001 | Favret, Jr. | B01D 17/00 | 210/188 |
| 6,673,133 B2 * | 1/2004 | Sechrist | B04C 3/04 | 55/348 |
| 7,332,010 B2 * | 2/2008 | Steiner | B01D 50/002 | 55/319 |
| 8,986,431 B2 * | 3/2015 | Cabourdin | B01D 46/2407 | 55/309 |
| 2003/0150324 A1 * | 8/2003 | West | B01D 17/0211 | 95/268 |
| 2009/0049809 A1 * | 2/2009 | Christiansen | B04C 3/06 | 55/319 |
| 2011/0209446 A1 * | 9/2011 | Kayat | B01D 45/08 | 55/322 |
| 2011/0247500 A1 * | 10/2011 | Akhras | B01D 17/0217 | 96/182 |
| 2012/0103423 A1 * | 5/2012 | Schook | B01D 45/16 | 137/1 |
| 2012/0111196 A1 * | 5/2012 | Schook | B01D 17/0217 | 95/271 |
| 2014/0116255 A1 * | 5/2014 | Perez Guerra | B04C 3/00 | 96/216 |
| 2015/0306528 A1 * | 10/2015 | Mueller | B04C 3/06 | 55/338 |
| 2016/0008751 A1 * | 1/2016 | McKenzie | B01D 45/08 | 95/267 |

\* cited by examiner

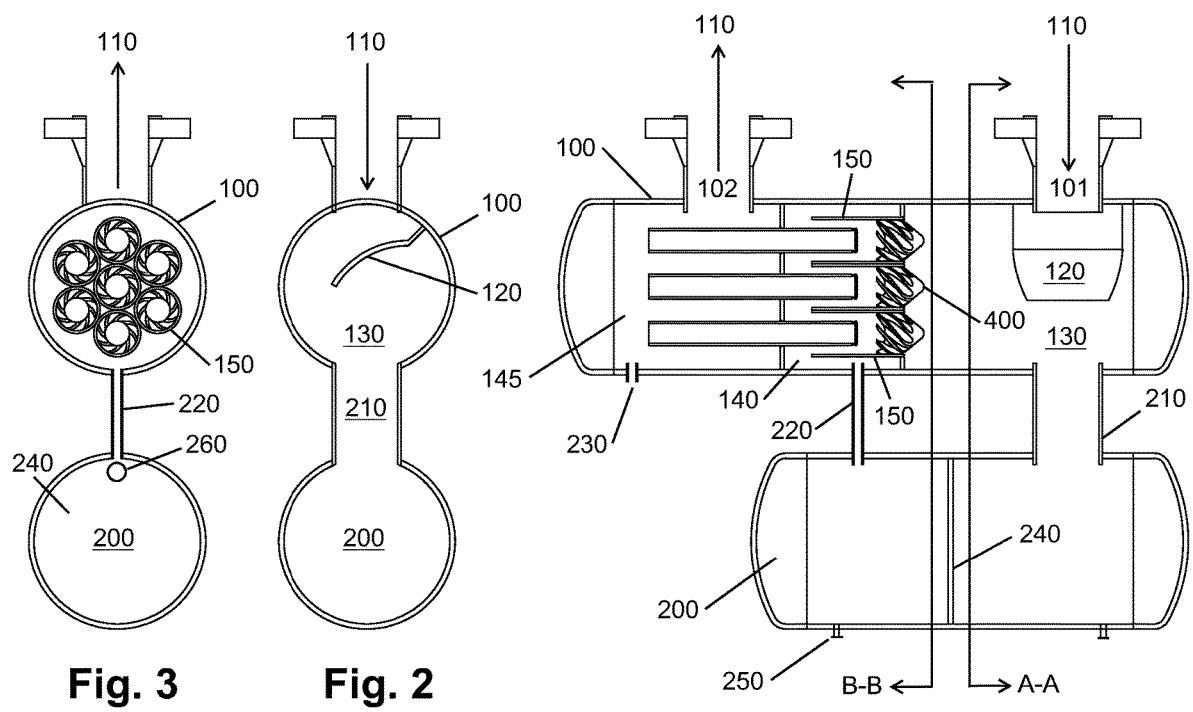

COMPACT AXIAL FLOW SEPARATOR

CROSS-REFERENCE TO RELATED APPLICATION

This application claims priority to U.S. Provisional Patent Application Ser. No. 62/470,319, filed on Mar. 12, 2017 and titled Compact Axial Flow Separator, which is incorporated herein in its entirety for all purposes.

FIELD OF THE INVENTION

The disclosure relates in general to systems and methods for removing liquids and particulate from flowing gas streams. More particularly, the disclosure relates to systems and methods for removing liquids and particulate from flowing gas streams by impingement and inertial separation of the liquid and particulate.

BACKGROUND

Flowing gas streams often contain particulate material that must be removed from the gas stream. The particulate material may be an undesirable contaminant in the gas stream. Alternatively, the gas stream may contain a desirable particulate material, for example, in a process for manufacturing the particulate. Similarly, flowing gas streams may contain liquids or aerosols, either desirable or undesirable, that must be removed from the gas stream.

There presently exist several systems and methods for removing particulate material and/or liquids from gas streams, including inertial, viscous, diffusion, filtration, and electrostatic separation systems and methods. These existing systems for separating solids and liquids from gas streams may be inefficient, pose unnecessary environmental hazards, and may be costly to manufacture and operate. Further background regarding available systems and methods may be found in the applicant's U.S. Pat. No. 9,101,869, which is hereby incorporated by reference in its entirety.

SUMMARY

In brief summary, embodiments include systems and methods for separating and removing liquid and particulate from flowing gas streams. A flowing gas stream containing liquids and/or particulate enters a separator vessel at an inlet. The system may include an inlet flow conditioner and first sump positioned near an upstream portion of the separator vessel to function as a slug catcher and separate large liquid slugs from the flowing gas stream. The liquid slug falls by gravity and inertia into the first sump. The flowing gas stream may then be directed through a plurality of helical separators to separate smaller liquid flows and particulate.

Each helical separator may be positioned within and near the top of an outer tube, and may include a plurality of adjacent separator fins that extend radially outward to form a plurality of helical channels. The upstream portion of the helical separators may include a rounded or elliptical nose portion. The helical channels and outer tube form a plurality of helical gas flow paths through which the flowing gas stream is directed. Liquids and encapsulated particulate are separated from the flowing gas stream in the helical channels. The nose portion reduces shatter of liquids in the flowing gas stream as the flowing gas stream contacts the upstream portion of each helical. A coaxial inner tube is positioned downstream from the helical separator to provide a flow path for the clean gas stream.

Liquid and encapsulated particulate exiting from the helical channels near the outer tube are directed to an annular space formed between the outer tube and inner tube. Once this liquid and encapsulated particulate passes the entrance to the inner tube for clean gas, the liquid and encapsulated particulate falls into a second sump.

The first sump that receives any liquid slug in the flowing gas stream is provided in fluid communication with the second sump that receives liquid and/or particulate exiting from the helical channels. Fluid communication between the first sump and the second sump may be provided by first and second drains near the bottom of the first sump and second sump, both of which drain flow into a common sump, which may optionally include a septum wall to maintain separation of the liquids. Gas communication between the first sump and the second sump tends to advantageously equalize the pressure between the first sump and the second sump. Gas communication between the first sump and the second sump further advantageously permits shortening the outer tube surrounding the helical element and the inner tube therein for flowing clean gas. A shorter inner tube and shorter outer tube permit a more compact overall length so as to fit the separator within smaller spaces.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

FIG. 1 is a cross section side view of an embodiment of a compact axial flow separator arranged for separating particulate and liquids from a flowing gas stream, including cross-section lines A-A and B-B to illustrate the views depicted in FIGS. 2 and 3.

FIG. 2 is a cross section end view along line A-A in FIG. 1.

FIG. 3 is a cross section end view along line B-B in FIG. 1.

DETAILED DESCRIPTION

Compact Axial Flow Separator

Figure 4:
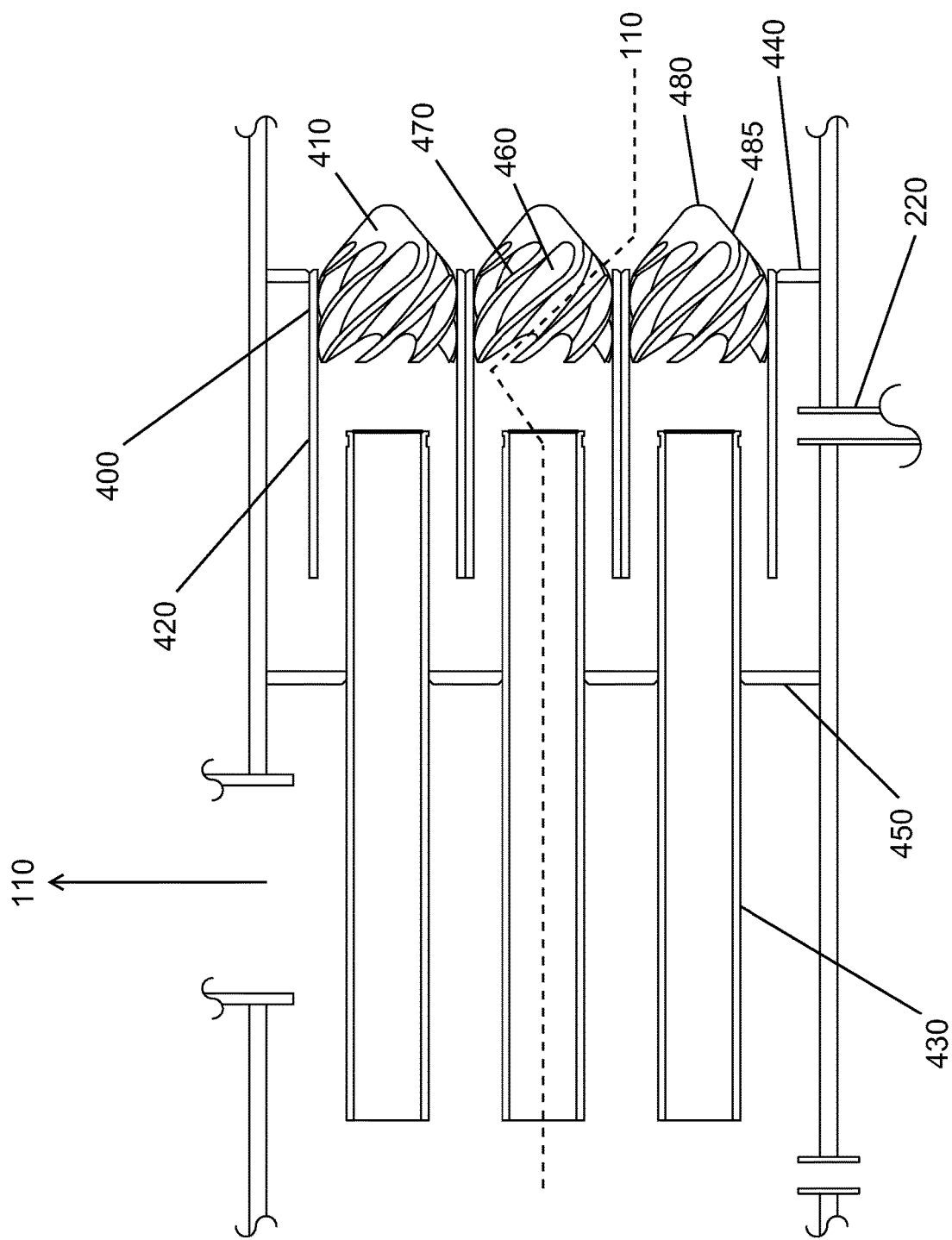
FIG. 4 is a more detailed partial cross section side view of the separator area depicted in claim 1.

FIG. 1 illustrates an embodiment of a compact axial flow separator adapted for separating liquids and solid particulate from flowing gas streams. In general, the system includes a separator vessel 100 hydraulically connected to a common sump 200.

A flowing gas stream 110 may contain particulate and/or liquid that must be removed. By way of example, gas stream 110 may be a stream of pressurized natural gas flowing through a natural gas distribution system. For such an application, the compact axial flow separator may be located in or near natural gas compressors, dehydration equipment, glycol contactor towers, or gas measurement equipment. In this manner, solids and liquids may be removed from the gas stream 110 before it enters the gas compressors or other equipment, where it would otherwise damage or degrade the efficiency of the equipment.

In FIGS. 1-3, separator vessel 100 is depicted as a horizontally-oblong cylindrical tank, but those skilled in the art would recognize that vessel 100 may be any closed container with a sufficient interior volume to enclose the internal components, as described more fully below. Vessel 100 includes a gas inlet 101 where the flowing gas stream 110 enters the vessel 100. Vessel 100 also includes a gas outlet 102 where the gas stream 110 exits the vessel after separation of the liquids and particulate.

Vessel 100 also includes one or more mechanical separators. The interior of the upstream portion of vessel 100 may first include an inlet flow conditioner 120. Inlet flow conditioner 120 deflects the gas stream 110 and acts to direct any liquid flow toward the interior walls of vessel 100. After deflection by the inlet flow conditioner 120, gas stream 110 generally flows downward toward first sump 130. From there, gas stream 110 must then enter the separator 150. In order to enter the separator 150, the gas stream 110 must again change direction. During this change of direction, inertia and gravity act to draw any liquid slugs or heavy liquid flow downward within the first sump 130. Gravity will then act to drain this liquid into first sump drain 210, and then into the common sump 200.

In this manner, the interior of the upstream portion of vessel 100 acts as a first stage mechanical separator for large liquid slugs or high volume liquid streams, before the gas stream 110 reaches the separator 150. Separator 150 is located downstream from inlet flow conditioner 120 and first sump 130. Separator 150 includes a plurality of helical separators 400 positioned coaxially within vessel 100. The upper end of the helical separators 400 are mounted in a plate or deck 440 (FIG. 4) such that the gas stream 110 is forced to flow through helical channels in a second stage of mechanical separation.

Helical Separator

The separator 150 illustrated in FIGS. 1, 3, and 4 may include a plurality of tightly-spaced helical separators 400, generally similar to the helical separators described in U.S. Pat. No. 9,101,869. However, the upstream portion of the helical separator 400 may also include a rounded or elliptical nose portion 480, as shown in FIG. 4. The nose portion 480 may be formed at the end of a conical portion 485, both of which tend to reduce shattering of liquids in the flowing gas stream 110 as it first contacts the upstream portion of each helical, as indicated by the dashed line 110 in FIG. 4. In this configuration, helical separators 400 may be smaller than those described U.S. Pat. No. 9,101,869. For example, the diameter of helical separator 400 may be two inches or even one inch (a size reduction of about one-half or one-fourth).

In brief overview, the gas stream 110 flows past nose portion 480 and conical portion 485, where it is directed into the upstream end of helical element 410, which is surrounded by outer tube 420. A plurality of channels 460 and fins 470 are formed in a circular pattern around the exterior of helical element 410. The channels 460 and fins 470 wind clockwise along the length of helical element 410 and, when surrounded by outer tube 420, form a plurality of helical gas flow paths.

The gas stream 110 flows through the helical flow paths provided by channels 460, fins 470, and outer tube 420. As described in in U.S. Pat. No. 9,101,869, when the gas stream 110 exits the bottom of helical element 410, liquid and particulate are directed outward toward the inner wall of outer tube 420, whereas clean gas is directed inwardly toward the opening of inner tube 430.

Inner tubes 430 are aligned coaxially with outer tubes 420 and are fixed in a second plate or deck 450. At the downstream end of vessel 100, clean gas exits the ends of inner tubes 430 and then exits the vessel 100 at clean gas outlet 102 (FIG. 1). Liquid and entrained particulate matter exiting the bottom of helical element 410 flows into the annular space formed between outer tube 420 and inner tube 430. This liquid and entrained particulate matter eventually flows past the downstream end of outer tube 420, whereupon gravity acts to draw the liquid and entrained particulate matter downward into a second sump 140.

Second sump 140 includes a second sump drain 220 at the bottom. Second sump drain 220 drains the waste liquid into the common sump 200, much like first sump drain 210 also drains waste liquid into the common sump 200. In this manner, first sump 130 and second sump 140 are connected and in fluid communication. In typical operating conditions, this fluid connection between first sump 130 and second sump 140 also permits a gas flow between the first sump 130 and the second sump 140, bypassing the separator 150. Such a bypass gas flow tends to reduce the pressure drop across the separator 150. It has been found that this reduced pressure drop across the separator 150 also permits a reduction of the required length of outer tube 420 and inner tube 430, without a reduction in separation performance. By way of example, the outer tube 420 may be reduced in length to 9 inches, and the length of the inner tube 430 extending upstream from the deck 450 may be reduced to 7 inches. The space between the downstream end of the helical element 410 and the upstream end of the inner tube 430 may be 2 inches. This reduction in the required length of outer tube 420 and inner tube 430 provides for a more compact design, reduces the cost of construction, and allows for a more flexible installation.

Common sump 200 may also a septum wall 240 to prevent mixing of waste liquid collected after the first stage of mechanical separation by inlet flow conditioner 120 and first sump 130, from the waste fluid collected after the second stage of mechanical separation by separators 150 and second sump 140. Waste fluid collected in the common sump 200 may be drained and removed by gravity using drains 250 located at the bottom of both sides of the common sump 200. The septum wall may also include a hole 260 or other void near the top to facilitate equalizing pressure, as discussed above.

The compact axial flow separator may also include a polishing chamber. After liquid slugs and higher volume liquid flows are removed by the inlet flow conditioner 120 and first sump 130, and after additional liquid is removed in the separator 150, cleaned gas exits the downstream end of inner tube 430. Vessel 100 may include a polishing chamber 145 at this location in order to remove any remaining liquid by mechanical separation. Here, the clean gas outlet 102 is positioned such that the clean gas exiting the inner tube 430 must again change directions before exiting the vessel 100. Inertial forces caused by this change in direction tend to remove most any remaining liquid. A drain 230 may be included to remove any liquid accumulating in the polishing chamber 145.

A compact axial flow separator as described above, including a common sump to equalize pressures, has been found to be not only less expensive and easier to install, but also more efficient in removing even small amounts of liquids and/or entrained solids. By way of example, in recent testing, the only liquid carryover remaining after long-term operation under high liquid loading conditions was measured at less than 0.1 gallon per million standard cubic feet of gas flow.

While various system and method embodiments have been shown and described herein, it should be understood that the disclosed systems and methods may be embodied in many other specific forms without departing from the spirit or scope of the invention. The present examples are to be considered as illustrative and not restrictive. The intention is not to be limited to the details given herein, but may be modified within the scope of the appended claims along with their full scope of equivalents.

What is claimed is:

1. A system for particle collection and hydraulic removal from a flowing gas stream, the system comprising:
   a vessel with a gas stream inlet and a gas stream outlet; and
   a plurality of horizontally oriented helical separators positioned between the gas stream inlet and the gas stream outlet, wherein the helical separators form helical channels for the gas stream;
   wherein the helical separators further comprise an outer tube with an upstream portion having an open end containing a helical element;
   wherein the helical element is positioned at an upstream end of the outer tube, and
   wherein the helical element includes an upstream portion with a rounded nose that extends upstream from the outer tube.

2. The system of claim 1 wherein the gas stream enters the gas stream inlet in a first direction, and the helical separators are oriented perpendicular to the first direction to cause the change in direction of the gas stream and to cause mechanical separation of liquids or solids in the gas stream.

3. The system of claim 1 wherein:
   the gas stream enters the gas stream inlet in a first direction; and
   the helical separators are oriented in a second direction perpendicular to the first direction,
   such that the change in direction of the gas stream from the first direction to the second direction causes mechanical separation of liquids or solids in the gas stream.

4. The system of claim 1 wherein the helical elements further include a conical portion extending upstream from the outer tube and terminating in the rounded nose.

5. The system of claim 1 further including:
   a chamber in the vessel positioned downstream from the helical separators and including a bottom with a drain;
   wherein the gas stream outlet is positioned above the bottom of the chamber and oriented perpendicular to the helical separators, to cause an additional change in direction of the gas stream and mechanically separate liquids or solids from the gas stream exiting the helical separators.

6. The system of claim 1 further including a flow conditioner positioned downstream from the gas stream inlet and upstream from the helical separators, wherein the flow conditioner deflects the gas stream to cause mechanical separation of liquids or solids in the gas stream.

7. The system of claim 1 wherein the gas stream outlet is oriented perpendicular to the helical separators, such that a change in direction of the gas stream from the helical separators to the gas stream outlet causes mechanical separation of liquids or solids in the gas stream.

8. The system of claim 1 wherein:
   the vessel forms a first space upstream from the helical separators and a second space downstream from the helical separators, the first and second spaces for collecting liquid separated from the gas stream;
   the vessel includes a first drain in the first space and a second drain in the second space; and
   a common sump is positioned in fluid communication with the first drain in the first space and the second drain in the second space, and forms a flow path between the first space and the second space bypassing the helical separators.

9. The system of claim 8, wherein:
   the upstream portion of the outer tube is mounted in a first deck extending across the vessel, wherein the deck forms part of the first space of the vessel;
   the helical separators further comprise an inner tube with an upstream portion having an open end that is positioned inside the outer tube and downstream from the helical element; and
   a downstream portion of the inner tube is mounted in a second deck extending across the vessel, wherein the second deck forms part of the second space of the vessel.

* * * * *